US012207679B2

(12) United States Patent
Batista et al.

(10) Patent No.: US 12,207,679 B2
(45) **Date of Patent: *Jan. 28, 2025**

(54) AEROSOL-GENERATING SYSTEM WITH IMPROVED AIR FLOW CONTROL

(71) Applicant: Philip Morris Products S.A., Neuchatel (CH)

(72) Inventors: Rui Nuno Batista, Morges (CH); Stephane Hedarchet, Pully (CH); Keethan Dasnavis Fernando, Neuchatel (CH); Ihar Nikolaevich Zinovik, Peseux (CH)

(73) Assignee: Philip Morris Products S.A., Neuchatel (CH)

( * ) Notice: Subject to any disclaimer, the term of this patent is extended or adjusted under 35 U.S.C. 154(b) by 122 days.

This patent is subject to a terminal disclaimer.

(21) Appl. No.: 17/339,610

(22) Filed: Jun. 4, 2021

(65) Prior Publication Data

US 2021/0289844 A1 Sep. 23, 2021

Related U.S. Application Data

(63) Continuation of application No. 15/323,883, filed as application No. PCT/EP2015/065911 on Jul. 10, 2015, now Pat. No. 11,051,545.

(30) Foreign Application Priority Data

Jul. 11, 2014 (EP) .................................... 14176832

(51) Int. Cl.
*A24F 1/00* (2006.01)
*A24F 40/20* (2020.01)
(Continued)

(52) U.S. Cl.
CPC ................ *A24F 1/00* (2013.01); *A24F 40/42* (2020.01); *A24F 40/46* (2020.01); *A24F 40/485* (2020.01);
(Continued)

(58) Field of Classification Search
CPC .......... A24F 1/00; A24F 40/485; A24F 40/42; A24F 40/20; A24F 40/46; H05B 1/0244; H05B 2203/021
See application file for complete search history.

(56) References Cited

U.S. PATENT DOCUMENTS 4,655,229 A 4/1987 Sensabaugh, Jr. et al.
5,505,214 A 4/1996 Collins et al.
(Continued)

FOREIGN PATENT DOCUMENTS

CN 1258223 A 6/2000
CN 102355914 A 2/2012
(Continued)

OTHER PUBLICATIONS

Chinese Office Action issued Jun. 13, 2022 in Chinese Patent Application No. 201580033132.7 (with English translation), 14 pages.
(Continued)

*Primary Examiner* — Dana Ross
*Assistant Examiner* — Adam M Eckardt
(74) *Attorney, Agent, or Firm* — Oblon, McClelland, Maier & Neustadt, L.L.P.

(57) ABSTRACT

An electrically operated aerosol-generating system is provided, including: an aerosol-generating device; an aerosol-forming cartridge including at least one aerosol-forming substrate, the aerosol-forming cartridge being at least partially received within the aerosol-generating device; at least one electric heater configured to heat the at least one
(Continued)

aerosol-forming substrate; at least one air inlet and at least one air outlet; and an air flow channel extending between the at least one air inlet and the at least one air outlet, the air flow channel being in fluid communication with the aerosol-forming substrate, the air flow channel having an internal wall surface on which one or more flow disturbing devices are disposed, the flow disturbing devices being arranged to create a turbulent boundary layer in a flow of air drawn through the air flow channel.

19 Claims, 2 Drawing Sheets

(51) Int. Cl.
*A24F 40/42* (2020.01)
*A24F 40/46* (2020.01)
*A24F 40/485* (2020.01)
*H05B 1/02* (2006.01)

(52) U.S. Cl.
CPC ............ *H05B 1/0244* (2013.01); *A24F 40/20* (2020.01); *H05B 2203/021* (2013.01)

(56) References Cited

U.S. PATENT DOCUMENTS

| | | | | |
|---|---|---|---|---|
| 5,613,504 | A | 3/1997 | Collins et al. | |
| 5,692,291 | A | 12/1997 | Deevi et al. | |
| 5,730,158 | A | 3/1998 | Collins et al. | |
| 5,865,185 | A | 2/1999 | Collins et al. | |
| 8,496,048 | B2 * | 7/2013 | Krasnov | F28F 9/0263 165/80.4 |
| 2006/0032501 | A1 * | 2/2006 | Hale | A61M 15/0031 128/203.12 |
| 2011/0094523 | A1 | 4/2011 | Thorens et al. | |
| 2012/0152239 | A1 * | 6/2012 | Shikani | A61M 16/0468 128/201.13 |
| 2013/0298905 | A1 | 11/2013 | Levin et al. | |
| 2013/0331205 | A1 * | 12/2013 | Tarao | A63B 37/0096 473/378 |
| 2014/0060554 | A1 | 3/2014 | Collett et al. | |
| 2014/0069424 | A1 | 3/2014 | Poston et al. | |
| 2016/0324211 | A1 | 11/2016 | Yankelevich | |

FOREIGN PATENT DOCUMENTS

| | | | | |
|---|---|---|---|---|
| CN | 102655773 | A | 9/2012 | |
| EP | 2319334 | A1 * | 5/2011 | A24F 47/00 |
| JP | 7-147965 | A | 6/1995 | |
| JP | 2008-509907 | A | 4/2008 | |
| JP | 2013-507976 | A | 3/2013 | |
| KR | 10-2012-0115488 | A | 10/2012 | |
| WO | 98/53869 | A1 | 12/1998 | |
| WO | 2010/107613 | A1 | 9/2010 | |
| WO | 2013/083636 | A1 | 6/2013 | |

OTHER PUBLICATIONS

"Engineering Fluid Mechanics", (edited by Liu Xiangjun), China Electric Power Press, 1st Edition, Aug. 2007, pp. 171-172.
"Principles of Turbulence Control", (edited by Fan Baochun et al.), National Defense Industry Press, 1st Edition, Jul. 2011, pp. 46-48.
U.S. Appl. No. 15/323,883, filed Jan. 4, 2017, 2017/0143041 A1, Rui Nuno Batista, et al.
International Search Report and Written Opinion issued Oct. 27, 2015 in PCT/EP2015/065911 filed Jul. 10, 2015.
Office Action and Search Report issued on Jan. 28, 2019 in the corresponding Chinese Patent Application No. 201580033132.7 with English Translation, 18 pages.
Communication under Rule 71(3) EPC issued Jun. 24, 2019 in corresponding European Patent Application No. 15736285.6, 29 pages.
Japanese Office Action issued Aug. 15, 2019 in Japanese Patent Application No. 2017-501393 (with English translation), 5 pages.
Combined Chinese Office Action and Search Report issued Jul. 28, 2020 in Chinese Patent Application No. 201580033132.7 (with English translation), 12 pages.
"Principles of Chemical Engineering(I) Final exam review", whuzhuxang, Retrieved from the internet: http://www.docin.com/p-42257974.html, p. 10, Jan. 20, 2010.
Korean Office Action issued Feb. 16, 2023 in Korean Patent Application No. 10-2016-7035750 (with English Translation), 5 pages.

* cited by examiner

AEROSOL-GENERATING SYSTEM WITH IMPROVED AIR FLOW CONTROL

CROSS-REFERENCE TO RELATED APPLICATIONS

This application is a continuation application of and claims the benefit of priority under 35 U.S.C. § 120 to U.S. application Ser. No. 15/323,883, filed on Jan. 4, 2017, which is a U.S. National Stage application of PCT/EP2015/065911, filed on Jul. 10, 2015, and claims benefit of priority under 35 U.S.C. § 119 from European Application No. 14176832.5, filed on Jul. 11, 2014, the entire contents of each of which are incorporated herein by reference.

TECHNICAL FIELD

The present invention relates to an aerosol-generating system having improved air flow control. The present invention finds particular application as an aerosol-generating system for heating a nicotine-containing aerosol-forming substrate.

DESCRIPTION OF THE RELATED ART

One type of aerosol-generating system is an electrically operated smoking system. Handheld electrically operated smoking systems consisting of an electric heater, an aerosol-generating device comprising a battery and control electronics, and an aerosol-forming cartridge are known. In use, a user typically draws on an end of the device or the cartridge to draw air through the system, the air flow passing through or across an aerosol-forming substrate to introduce aerosol particles into the air flow.

However, known aerosol-generating systems often provide little control of the air flow through the system. An example of such a system is shown in U.S. Pat. No. 5,505,214-A, which describes a smoking article comprising a tubular carrier and a tobacco flavour material provided on an internal surface of the tubular carrier, wherein an air passageway and aerosol cavity is formed through the tubular carrier. However, there is no means for controlling the air flow through the air passageway and aerosol cavity. In some systems, as a user increases the level of draw on the system they may experience a sudden change in the resistance to draw, which can be undesirable and can prevent delivery of a consistent aerosol composition.

Accordingly, it would be desirable to produce an aerosol-generating system that addresses the issue of controlled air flow through the system

SUMMARY

According to the present invention there is provided an aerosol-generating system comprising an aerosol-generating device and an aerosol-forming cartridge. The aerosol-forming cartridge comprises a base layer and at least one aerosol-forming substrate provided on the base layer. The base layer and the at least one aerosol-forming substrate are substantially flat and are arranged substantially parallel to each other. In use, the aerosol-forming cartridge is at least partially received within the aerosol-generating device. The system further comprises at least one electric heater arranged to heat the at least one aerosol-forming substrate during use, at least one air inlet and at least one air outlet. In use, the aerosol-generating system further comprises an air flow channel extending between the at least one air inlet and the at least one air outlet. The air flow channel is in fluid communication with the aerosol-forming substrate, and the air flow channel has an internal wall surface on which one or more flow disturbing devices are disposed, the flow disturbing devices being arranged to create a turbulent boundary layer in a flow of air drawn through the air flow channel.

BRIEF DESCRIPTION OF THE DRAWINGS

The invention will now be further described, by way of example only, with reference to the accompanying drawings in which.

DETAILED DESCRIPTION

Figure 1:
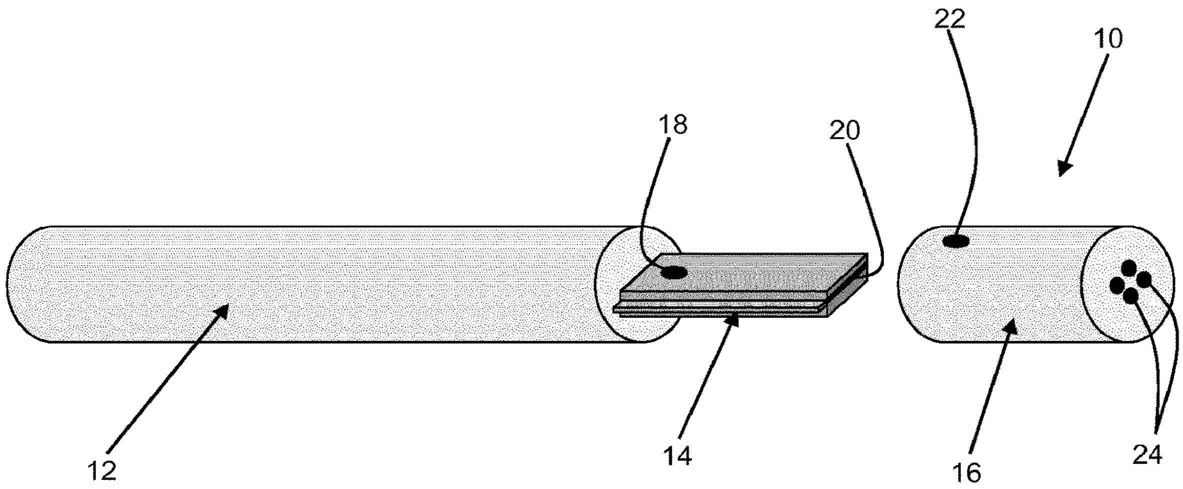
FIG. 1 shows an aerosol-generating system according to an embodiment of the present invention.

As used herein, the term "aerosol-generating system" refers to the combination of an aerosol-generating device, an aerosol-forming cartridge and a heater, as further described and illustrated herein. In the system, the device, the cartridge and the heater cooperate to generate an aerosol.

As used herein, the term "aerosol-generating device" refers to a device that interacts with an aerosol-forming cartridge and a heater to generate an aerosol. The aerosol-generative device includes an electric power supply to operate the heater for heating the aerosol-forming cartridge.

As used herein, the term "cartridge" refers to a consumable article which is configured to couple to an aerosol-generating device and which is assembled as a single unit that can be coupled and uncoupled as a single unit.

As used herein, the term "aerosol-forming cartridge" refers to a cartridge comprising at least one aerosol-forming substrate that is capable of releasing volatile compounds that can form an aerosol. For example, an aerosol-forming cartridge may be a smoking article that generates an aerosol.

As used herein, the term 'aerosol-forming substrate' is used to describe a substrate capable of releasing volatile compounds, which can form an aerosol. The aerosols generated from aerosol-forming substrates of aerosol-forming cartridges according to the invention may be visible or invisible and may include vapours (for example, fine particles of substances, which are in a gaseous state, that are ordinarily liquid or solid at room temperature) as well as gases and liquid droplets of condensed vapours.

By providing an air flow channel having one or more flow disturbing devices on an internal wall surface to create a turbulent boundary layer in a flow of air drawn through the air flow channel, the present inventors have recognised that aerosol-generating systems according to the present invention can provide a resistance to draw that is relatively consistent, regardless of the level of draw on the system. This is in contrast to prior art systems, such as the smoking article described in U.S. Pat. No. 5,505,214-A, in which an increase in draw may cause a sudden change in the resistance to draw. It is thought that the sudden change in resistance to draw in prior art systems results from the separation of a laminar boundary layer of air flow from a wall of the air flow channel as the level of draw increases above a certain level. However, in aerosol-generating systems according to the present invention, the turbulent boundary layer caused by the one or more flow disturbing devices mitigates this effect. The prior art, such as U.S. Pat. No. 5,505,214-A, does not describe or suggest the use of such flow disturbing devices.

In some embodiments, the flow disturbing devices comprise one or more dimples or undulations on the internal wall surface. Advantageously, one or more dimples and undulations are particularly effective for providing the required turbulent boundary layer in the air flow channel. Furthermore, dimples and undulations are relatively simple to form in materials typically used to construct components for aerosol-generating systems. For example, dimples and undulations can be formed by moulding, stamping, embossing, debossing, and combinations thereof. The present inventors have also recognised that depressions in the internal wall surface formed by dimples or undulations can create areas of reduced air pressure within the airflow channel. This is particularly advantageous in embodiments in which the one or more dimples or undulations are provided on at least a portion of the internal wall surface opposite the at least one aerosol-forming substrate, as the regions of reduced air pressure can facilitate migration of volatile compounds from the aerosol-forming substrate into the air flow.

In those embodiments in which the flow disturbing devices comprise one or more dimples or undulations, the dimples or undulations preferably have a number average maximum depth of from about 0.3 millimetres to about 0.8 millimetres. Additionally, or alternatively, the one or more dimples or undulations preferably have a number average maximum depth of from about 15 percent to about 80 percent of the thickness of the air flow channel, more preferably from about 30 percent to about 50 percent of the thickness of the air flow channel. One or more dimples or undulations having dimensions within one or both of these ranges have been found to be particularly effective at providing a turbulent boundary layer flow.

As used herein, the term "number average maximum depth" refers to the average depth of the dimples or undulations, wherein the depth of each dimple or undulation is measured at its maximum depth.

In any of the embodiments described above, the flow disturbing devices preferably comprise a plurality of dimples on the internal wall surface. Preferably, the dimples have a number average maximum diameter of from about 3 millimetres to about 6 millimetres, more preferably from about 3 millimetres to about 5 millimetres, most preferably from about 3 millimetres to about 4 millimetres. Increasing the dimple size above 6 millimetres can reduce the effectiveness of the dimples in creating the desired turbulent boundary layer flow.

As used herein, the term "number average maximum diameter" refers to the average diameter of the dimples, wherein the diameter of each dimple is measured at its maximum diameter.

In any of the embodiments described above, the air flow channel preferably comprises a diffuser section in which a flow area of the channel is increased in the downstream direction from the air inlet to the air outlet. Preferably, the at least one aerosol-generating substrate is provided at least partly in the diffuser section of the airflow channel. Providing a diffuser section advantageously reduces the velocity of the airflow as it enters the diffuser section and facilitates the formation of aerosol droplets of a larger size. However, preferably, the maximum cross-sectional area of the diffuser section is not too large compared to the cross-sectional area of the air flow inlet, otherwise the air flow velocity can be reduced to a level at which the aerosol droplets begin to condense on the inside of the air flow channel. Therefore, the maximum cross-sectional area of the air inlet is preferably between about 1 percent and about 40 percent of the maximum cross-sectional area of the diffuser section, more preferably between about 5 percent and about 20 percent of the maximum cross-sectional area of the diffuser section. In those embodiments in which the air inlet comprises a plurality of apertures, the area of the air inlet is the combined area of the plurality of apertures.

As used herein, the term "flow area" refers to the cross-sectional area of the air flow channel in a plane that is perpendicular to the general direction of the air flow through the channel.

The aerosol-forming cartridge comprises a base layer and at least one aerosol-forming substrate provided on the base layer, wherein the base layer and the at least one aerosol-forming substrate are substantially flat and are arranged substantially parallel to each other.

As used herein, the term "substantially flat" refers to a component having a thickness to width ratio of at least about 1:2. Preferably, the thickness to width ratio is less than about 1:20 to minimise the risk of bending or breaking the component.

Flat components can be easily handled during manufacture. In addition, it has been found that aerosol release from the aerosol-forming substrate is improved when it is substantially flat and when arranged so that the flow of air is drawn across the width, length, or both, of the aerosol-forming substrate.

The aerosol-forming cartridge may further comprise a top cover overlying the at least one aerosol-forming substrate and secured to the base layer. In such embodiments, the air flow channel is at least partially defined between the top cover and the base layer so that the at least one aerosol-generating substrate is in fluid communication with the air flow channel.

In embodiments comprising a top cover, the internal wall surface on which the one or more flow disturbing devices are disposed is preferably at least partially formed by the top cover. This construction can simplify the manufacture of the system, as the one or more flow devices can be formed on one or both of the top cover and the base layer before the top cover and the base layer are secured together to create the airflow channel. In other words, the air flow channel can be manufactured in two parts, which facilitates the formation of features on the internal wall surface of the air flow channel. This method of construction is particularly advantageous in embodiments in which the air flow channel comprises a variable cross-section, such as those embodiments in which the air flow channel comprises a diffuser section.

As an alternative to providing a top cover on the aerosol-forming cartridge, the aerosol-generating device may comprise a wall overlying the at least one aerosol-forming substrate and the base layer when the aerosol-forming cartridge is inserted into the aerosol-generating device. In these embodiments, the air flow channel is at least partially defined between the aerosol-generating device wall and the base layer so that the at least one aerosol-generating substrate is in fluid communication with the air flow channel.

In such embodiments, the internal wall surface on which the one or more flow disturbing devices are disposed is preferably at least partially formed by the aerosol-generating device wall. In a similar manner to those embodiments comprising a top cover, this method of construction can simplify the manufacture of the system. In particular, it is possible to form the one or more flow devices on one or both of the aerosol-generating device wall and the base layer during manufacture of the system, and the air flow channel is not created until the cartridge is inserted into the device by a user. In other words, the air flow channel is manufactured in two parts, which facilitates the formation of features on the internal wall surface of the air flow channel. This method of construction is particularly advantageous in embodiments in which the air flow channel comprises a variable cross-section, such as those embodiments in which the air flow channel comprises a diffuser section.

In any of the embodiments described above, the flow disturbing devices preferably occupy from about 30% to about 100% of the internal wall surface area. Providing flow disturbing devices over an area of the internal wall surface within this range can provide sufficient turbulence in the boundary layer flow to optimise the stability of the resistance to draw through the system.

In any of the embodiments described above the air flow channel preferably has a substantially oblong cross-sectional shape along at least part of its length.

As used herein, the term "substantially oblong" refers to a substantially rectangular shape having a length greater than its width. That is, an oblong is a non-square rectangle.

To maximise the surface area over which the flow disturbing devices are provided, the flow disturbing devices are preferably provided on one or both of the long sides of the substantially oblong shape. Additionally, the flow disturbing devices may be provided on one or both of the short sides of the substantially oblong shape.

To provide a substantially flat aerosol-forming cartridge, the aerosol-forming substrate is preferably substantially flat and provided on one of the long sides of the oblong shape.

Additionally, or alternatively, in those embodiments comprising a diffuser section, preferably the height of the air flow channel remains constant and the width of the airflow channel increases in the downstream direction in the diffuser section. That is, the length of the short sides of the substantially oblong shape preferably remains constant and the length of the long sides of the substantially oblong shape preferably increases in the downstream direction in the diffuser section.

In any of the embodiments described above, the at least one aerosol-forming substrate may comprise nicotine. For example, the at least one aerosol-forming substrate may comprise a tobacco-containing material with volatile tobacco flavour compounds which are released from the aerosol-forming substrate upon heating.

Preferably, the aerosol-forming substrate comprises an aerosol former, that is, a substance which generates an aerosol upon heating. The aerosol former may be, for instance, a polyol aerosol former or a non-polyol aerosol former. It may be a solid or liquid at room temperature, but preferably is a liquid at room temperature. Suitable polyols include sorbitol, glycerol, and glycols like propylene glycol or triethylene glycol. Suitable non-polyols include monohydric alcohols, such as menthol, high boiling point hydrocarbons, acids such as lactic acid, and esters such as diacetin, triacetin, triethyl citrate or isopropyl myristate. Aliphatic carboxylic acid esters such as methyl stearate, dimethyl dodecanedioate and dimethyl tetradecanedioate can also be used as aerosol formers. A combination of aerosol formers may be used, in equal or differing proportions. Polyethylene glycol and glycerol may be particularly preferred, whilst triacetin is more difficult to stabilise and may also need to be encapsulated in order to prevent its migration within the product. The aerosol-forming substrate may include one or more flavouring agents, such as cocoa, liquorice, organic acids, or menthol.

The aerosol-forming substrate may comprise a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Optionally, the solid substrate may contain additional tobacco or non-tobacco volatile flavour compounds, to be released upon heating of the substrate. Optionally, the solid substrate may also contain capsules that, for example, include the additional tobacco or non-tobacco volatile flavour compounds. Such capsules may melt during heating of the solid aerosol-forming substrate. Alternatively, or in addition, such capsules may be crushed prior to, during, or after heating of the solid aerosol-forming substrate.

Where the aerosol-forming substrate comprises a solid substrate comprising homogenised tobacco material, the homogenised tobacco material may be formed by agglomerating particulate tobacco. The homogenised tobacco material may be in the form of a sheet. The homogenised tobacco material may have an aerosol-former content of greater than 5 percent on a dry weight basis. The homogenised tobacco material may alternatively have an aerosol former content of between 5 percent and 30 percent by weight on a dry weight basis. Sheets of homogenised tobacco material may be formed by agglomerating particulate tobacco obtained by grinding or otherwise comminuting one or both of tobacco leaf lamina and tobacco leaf stems; alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco. Alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof. Sheets of homogenised tobacco material are preferably formed by a casting process of the type generally comprising casting a slurry comprising particulate tobacco and one or more binders onto a conveyor belt or other support surface, drying the cast slurry to form a sheet of homogenised tobacco material and removing the sheet of homogenised tobacco material from the support surface.

Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, such as those disclosed in U.S. Pat. Nos. 5,505,214, 5,591,368 and 5,388,594, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix. The solid substrate may be deposited on the surface of the carrier in the form of, for example, a sheet, foam, gel or slurry. The solid substrate may be deposited on the entire surface of the carrier, or alternatively, may be deposited in a pattern in order to provide a predetermined or non-uniform flavour delivery during use. Alternatively, the carrier may be a non-woven fabric or fibre bundle into which tobacco components have been incorporated, such as that described in EP-A-0 857 431. The non-woven fabric or fibre bundle may comprise, for example, carbon fibres, natural cellulose fibres, or cellulose derivative fibres.

As an alternative to a solid tobacco-based aerosol-forming substrate, the at least one aerosol-forming substrate may comprise a liquid substrate and the cartridge may comprise means for retaining the liquid substrate, such as one or more containers. Alternatively or in addition, the cartridge may comprise a porous carrier material, into which the liquid substrate is absorbed, as described in WO-A-2007/024130, WO-A-2007/066374, EP-A-1 736 062, WO-A-2007/131449 and WO-A-2007/131450.

The liquid substrate is preferably a nicotine source comprising one or more of nicotine, nicotine base, a nicotine salt, such as nicotine-HCl, nicotine-bitartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent or a liquid tobacco extract.

The nicotine source may further comprise an electrolyte forming compound. The electrolyte forming compound may be selected from the group consisting of alkali metal hydroxides, alkali metal oxides, alkali metal salts, alkaline earth metal oxides, alkaline earth metal hydroxides and combinations thereof.

For example, the nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulfate and combinations thereof.

In certain embodiments, the nicotine source may comprise an aqueous solution of nicotine, nicotine base, a nicotine salt or a nicotine derivative and an electrolyte forming compound.

Alternatively or in addition, the nicotine source may further comprise other components including, but not limited to, natural flavours, artificial flavours and antioxidants.

In addition to a nicotine-containing aerosol-forming substrate, each of the first and second aerosol-forming substrates may further comprise a source of a volatile delivery enhancing compound that reacts with the nicotine in the gas phase to aid delivery of the nicotine to the user.

The volatile delivery enhancing compound may comprise a single compound. Alternatively, the volatile delivery enhancing compound may comprise two or more different compounds.

Preferably, the volatile delivery enhancing compound is a volatile liquid.

The volatile delivery enhancing compound may comprise an aqueous solution of one or more compounds. Alternatively the volatile delivery enhancing compound may comprise a non-aqueous solution of one or more compounds.

The volatile delivery enhancing compound may comprise two or more different volatile compounds. For example, the volatile delivery enhancing compound may comprise a mixture of two or more different volatile liquid compounds.

Alternatively, the volatile delivery enhancing compound may comprise one or more non-volatile compounds and one or more volatile compounds. For example, the volatile delivery enhancing compound may comprise a solution of one or more non-volatile compounds in a volatile solvent or a mixture of one or more non-volatile liquid compounds and one or more volatile liquid compounds.

In one embodiment, the volatile delivery enhancing compound comprises an acid. The volatile delivery enhancing compound may comprise an organic acid or an inorganic acid. Preferably, the volatile delivery enhancing compound comprises an organic acid, more preferably a carboxylic acid, most preferably an alpha-keto or 2-oxo acid.

In a preferred embodiment, the volatile delivery enhancing compound comprises an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid and combinations thereof. In a particularly preferred embodiment, the volatile delivery enhancing compound comprises pyruvic acid.

As an alternative to a solid or liquid aerosol-forming substrate, the at least one aerosol-forming substrate may be any other sort of substrate, for example, a gas substrate, a gel substrate, or any combination of the various types of substrate described.

In any of the embodiments described above, the at least one aerosol-forming substrate may comprise a single aerosol-forming substrate. Alternatively, the at least one aerosol-forming substrate may comprise a plurality of aerosol-forming substrates. The plurality of aerosol-forming substrates may have the substantially the same composition. Alternatively, the plurality of aerosol-forming substrates may comprise two or more aerosol-forming substrates having substantially different compositions. The plurality of aerosol-forming substrates may be stored together on the base layer. Alternatively, the plurality of aerosol-forming substrates may be stored separately. By separately storing two or more different portions of aerosol-forming substrate, it is possible to store two substances which are not entirely compatible in the same cartridge. Advantageously, separately storing two or more different portions of aerosol-forming substrate may extend the life of the cartridge. It also enables two incompatible substances to be stored in the same cartridge. Further, it enables the aerosol-forming substrates to be aerosolised separately, for example by heating each aerosol-forming substrate separately. Thus, aerosol-forming substrates with different heating profile requirements can be heated differently for improved aerosol formation. It may also enable more efficient energy use, since more volatile substances can be separately from less volatile substances and to a lesser degree. Separate aerosol-forming substrates can also be aerosolised in a predefined sequence, for example by heating a different one of the plurality of aerosol-forming substrates for each use, ensuring a 'fresh' aerosol-forming substrate is aerosolised each time the cartridge is used. In those embodiments comprising a liquid nicotine aerosol-forming substrate and a volatile delivery enhancing compound aerosol-forming substrate, the nicotine and the volatile delivery enhancing compound are advantageously stored separately and reacted together in the gas phase only when the system is in operation.

In certain preferred embodiments, each aerosol-forming substrate has a vaporisation temperature of from about 60 degrees Celsius to about 320 degrees Celsius, preferably from about 70 degrees Celsius to about 230 degrees Celsius, preferably from about 90 degrees Celsius to about 180 degrees Celsius.

The at least one electric heater may comprise one or more electric heaters provided in the aerosol-generating device. Alternatively, the at least one electric heater may be a removable heater that can be inserted into and removed from the aerosol-generating device to facilitate cleaning and replacement of the heater. Advantageously, this arrangement also allows the user to change the type of electric heater inserted into the device to accommodate different aerosol-forming articles. Furthermore, using a removable heater that is separate from both the device and the cartridge allows the heater to be used to heat multiple cartridges.

In a further alternative, the at least one electric heater may comprise at least one electric heater forming part of the aerosol-forming cartridge.

In any of the embodiments described above, the heater may comprise an electrically insulating substrate, wherein the at least one electric heater element comprises one or more substantially flat heater elements arranged on the electrically insulating substrate. The substrate may be flexible. The substrate may be polymeric. The substrate may be a multi-layer polymeric material. The heating element, or heating elements, may extend across one or more apertures in the substrate.

In use, the heater may be arranged to heat the aerosol-forming substrate by one or more of conduction, convection and radiation. The heater may heat the aerosol-forming substrate by means of conduction and may be at least partially in contact with the aerosol-forming substrate. Alternatively, or in addition, the heat from the heater may be conducted to the aerosol-forming substrate by means of an intermediate heat conductive element. Alternatively, or in addition, the heater may transfer heat to the incoming ambient air that is drawn through or past the cartridge during use, which in turn heats the aerosol-forming substrate by convection.

The heater may comprise an internal electric heating element for at least partially inserting into the aerosol-forming substrate. An "internal heating element" is one which is suitable for insertion into an aerosol-forming material. Alternatively or additionally, the electric heater may comprise an external heating element. The term "external heating element" refers to one that at least partially surrounds the aerosol-forming cartridge. The heater may comprise one or more internal heating elements and one or more external heating elements. The heater may comprise a single heating element. Alternatively, the heater may comprise more than one heating element.

The at least one heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required. Alternatively, the heater may comprise an infra-red heating element, a photonic source, or an inductive heating element.

The heater may take any suitable form. For example, the heater may take the form of a heating blade. Alternatively, the heater may take the form of a casing or substrate having different electro-conductive portions, or an electrically resistive metallic tube. Alternatively, the heater may comprise one or more heating needles or rods that run through the centre of the aerosol-forming substrate. Alternatively, the heater may be a disk (end) heater or a combination of a disk heater with heating needles or rods. The heater may comprise one or more stamped portions of electrically resistive material, such as stainless steel. Other alternatives include a heating wire or filament, for example a Ni—Cr (Nickel-Chromium), platinum, tungsten or alloy wire or a heating plate.

In certain preferred embodiments, the heater comprises a plurality of electrically conductive filaments. The plurality of electrically conductive filaments may form a mesh or array of filaments or may comprise a woven or non-woven fabric.

The electrically conductive filaments may define interstices between the filaments and the interstices may have a width of between 10 μm and 100 μm. Preferably the filaments give rise to capillary action in the interstices, so that when the heater is placed in contact with a liquid-containing aerosol-forming substrate, liquid to be vapourised is drawn into the interstices, increasing the contact area between the heater assembly and the liquid. The electrically conductive filaments may form a mesh of size between 160 and 600 Mesh US (+1-10 percent) (i.e. between 160 and 600 filaments per inch (+1-10 percent). The width of the interstices is preferably between 25 μm and 75 μm. The percentage of open area of the mesh, which is the ratio of the area of the interstices to the total area of the mesh, is preferably between 25 percent and 56 percent. The mesh may be formed using different types of weave or lattice structures. The mesh, array or fabric of electrically conductive filaments may also be characterised by its ability to retain liquid, as is well understood in the art. The electrically conductive filaments may have a diameter of between 10 μm and 100 μm, preferably between 8 μm and 50 μm, and more preferably between 8 μm and 39 μm. The filaments may have a round cross section or may have a flattened cross-section. The heater filaments may be formed by etching a sheet material, such as a foil. This may be particularly advantageous when the heater comprises an array of parallel filaments. If the heater comprises a mesh or fabric of filaments, the filaments may be individually formed and knitted together. The electrically conductive filaments may be provided as a mesh, array or fabric. The area of the mesh, array or fabric of electrically conductive filaments may be small, preferably less than or equal to 25 square millimetres, allowing it to be incorporated in to a handheld system. The mesh, array or fabric of electrically conductive filaments may, for example, be rectangular and have dimensions of 5 mm by 2 mm. Preferably, the mesh or array of electrically conductive filaments covers an area of between 10 percent and 50 percent of the area of the heater. More preferably, the mesh or array of electrically conductive filaments covers an area of between 15 percent and 25 percent of the area of the heater.

In one embodiment, electric energy is supplied to the electric heater until the heating element or elements of the electric heater reach a temperature of between approximately 180 degrees Celsius and about 310 degrees Celsius. Any suitable temperature sensor and control circuitry may be used in order to control heating of the heating element or elements to reach the required temperature. This is in contrast to conventional cigarettes in which the combustion of tobacco and cigarette wrapper may reach 800 degrees Celsius.

Preferably, the minimum distance between the electric heater and the at least one aerosol-forming substrate is less than 50 micrometres, preferably the cartridge comprises one or more layers of capillary fibres in the space between the electric heater and the aerosol-forming substrate.

The heater may comprise one or more heating elements above the aerosol-forming substrate. Alternatively, the heater may comprise one or more heating elements below the aerosol-forming substrate. With this arrangement, heating of the aerosol-forming substrate and aerosol release occur on opposite sides of the aerosol-forming cartridge. This has been found to be particularly effective for aerosol-forming substrates which comprise a tobacco-containing material. In certain embodiments, the heater comprises one or more heating elements positioned adjacent to opposite sides of the aerosol-forming substrate. Preferably the heater comprises a plurality of heating elements arranged to heat a different portion of the aerosol-forming substrate. In certain preferred embodiments, the aerosol-forming substrate comprises a plurality of aerosol-forming substrates arranged separately on a base layer and the heater comprises a plurality of heating elements each arranged to heat a different one of the plurality of aerosol-forming substrates.

The aerosol-forming cartridge may have any suitable size. Preferably, the cartridge has suitable dimensions for use with a handheld aerosol-generating device. In certain embodiments, the cartridge has length of from about 5 mm to about 200 mm, preferably from about 10 mm to about 100 mm, more preferably from about 20 mm to about 35 mm. In certain embodiments, the cartridge has width of from about 5 mm to about 12 mm, preferably from about 7 mm to about 10 mm. In certain embodiments, the cartridge has a height of from about 2 mm to about 10 mm, preferably from about 5 mm to about 8 mm.

In use, at least one of the aerosol-forming cartridge and the aerosol-generating device may be connected to a separate mouthpiece portion by which a user can draw a flow of air through or adjacent to the cartridge by sucking on a downstream end of the mouthpiece portion. In such embodiments, preferably, the cartridge is arranged such that the resistance to draw at a downstream end of the mouthpiece portion is from about 50 mmWG to about 130 mmWG, more preferably from about 80 mmWG to about 120 mmWG, more preferably from about 90 mmWG to about 110 mmWG, most preferably from about 95 mmWG to about 105 mmWG. As used herein, the term "resistance to draw" refers the pressure required to force air through the full length of the object under test at a rate of 17.5 ml/sec at 22° C. and 101 kPa (760 Torr). Resistance to draw is typically expressed in units of millimetres water gauge (mmWG) and is measured in accordance with ISO 6565:2011.

The aerosol-forming cartridge may comprise one or more electrical contacts. The electrical contacts provided on the aerosol-forming cartridge may be accessible from outside of the cartridge. The electrical contacts may be positioned along one or more edges of the cartridge. In certain embodiments, the electrical contacts may be positioned along a lateral edge of the cartridge. For example, the electrical contacts may be positioned along the upstream edge of the cartridge. Alternatively, or in addition, the electrical contacts may be positioned along a single longitudinal edge of the cartridge. The electrical contacts on the cartridge may comprise data contacts for transferring data to or from the cartridge, or both to and from the cartridge.

The aerosol-forming cartridge may comprise a protective foil positioned over at least part of the at least one aerosol-forming substrate. The protective foil may be gas impermeable. The protective foil may be arranged to hermetically seal the aerosol-forming substrate within the cartridge. As used herein, the term "hermetically seal" means that the weight of the volatile compounds in the aerosol-forming substrate changes by less than 2% over a two week period, preferably over a two month period, more preferably over a two year period.

In those embodiments in which the cartridge comprises a base layer, the base layer may comprise at least one cavity in which the aerosol-forming substrate is held. In these embodiments, the protective foil may be arranged to close the one or more cavities. The protective foil may be at least partially removable to expose the at least one aerosol-forming substrate. Preferably, the protective foil is removable. Where the base layer comprises a plurality of cavities in which a plurality of aerosol-forming substrates are held, the protective foil may be removable in stages to selectively unseal one or more of the aerosol-forming substrates. For example, the protective foil may comprise one or more removable sections, each of which is arranged to reveal one or more of the cavities when removed from the remainder of the protective foil. Alternatively, or in addition, the protective foil may be attached such that the required removal force varies between the various stages of removal as an indication to the user. For example, the required removal force may increase between adjacent stages so that the user must deliberately pull harder on the protective foil to continue removing the protective foil. This may be achieved by any suitable means. For example, the pulling force may be varied by altering the type, quantity, or shape of an adhesive layer, or by altering the shape or amount of a weld line by which the protective foil is attached.

The protective foil may be removably attached to the base layer either directly or indirectly via one or more intermediate components. The protective foil may be removably attached by any suitable method, for example using adhesive. The protective foil may be removably attached by ultrasonic welding. The protective foil may be removably attached by ultrasonic welding along a weld line. The weld line may be continuous. The weld line may comprise two or more continuous weld lines arranged side by side. With this arrangement, the seal can be maintained provided at least one of the continuous weld lines remains intact.

The protective foil may be a flexible film. The protective foil may comprise any suitable material or materials. For example, the protective foil may comprise a polymeric foil, for example Polypropylene (PP) or Polyethylene (PE). The protective foil may comprise a multilayer polymeric foil.

Preferably, the aerosol-generating device comprises an electric power supply for supplying power to the at least one electric heater. The electric power supply may be a DC voltage source. In preferred embodiments, the power supply is a battery. For example, the power supply may be a Nickel-metal hydride battery, a Nickel cadmium battery, or a Lithium based battery, for example a Lithium-Cobalt, a Lithium-Iron-Phosphate or a Lithium-Polymer battery. The power supply may alternatively be another form of charge storage device such as a capacitor. The power supply may require recharging and may have a capacity that allows for the storage of enough energy for use of the aerosol-generating device with one or more aerosol-forming cartridges.

The aerosol-generating device may comprise one or more temperature sensors configured to sense the temperature of at least one of the heater and the one or more aerosol-forming substrates. In such embodiments, a controller may be configured to control the supply of power to the heater based on the sensed temperature.

In those embodiments in which the heater comprises at least one resistive heating element, the at least one heater element may be formed using a metal having a defined relationship between temperature and resistivity. In such embodiments, the metal may be formed as a track between two layers of suitable insulating materials. A heater element formed in this manner may be used both as a heater and a temperature sensor.

In any of the embodiments described above, the aerosol-generating device may comprise an external plug or socket allowing the aerosol-generating device to be connected to another electrical device. For example, the aerosol-generating device may comprise a USB plug or a USB socket to allow connection of the aerosol-generating device to another USB enabled device. For example, the USB plug or socket may allow connection of the aerosol-generating device to a USB charging device to charge a rechargeable power supply within the aerosol-generating device. Additionally, or alternatively, the USB plug or socket may support the transfer of data to or from, or both to and from, the aerosol-generating device. For example, the device may be connected to a computer to download data from the device, such as usage data. Additionally, or alternatively, the device may be connected to a computer to transfer data to the device, such as new heating profiles for new or updated aerosol-forming cartridges, wherein the heating profiles are stored within a data storage device within the aerosol-generating device.

In those embodiments in which the device comprises a USB plug or socket, the device may further comprise a removable cover that covers the USB plug or socket when not in use. In embodiments in which the USB plug or socket is a USB plug, USB plug may additionally or alternatively be selectively retractable within the device.

FIG. 1 shows an aerosol-generating system 10 in accordance with an embodiment of the present invention. The system 10 comprises an aerosol-generating device 12, an aerosol-forming cartridge 14 and a removable mouthpiece 16. The mouthpiece 16 is configured to be removable from the aerosol-generating device 10 to allow insertion of the cartridge 14 into the device 10. After the cartridge 14 has been inserted into the device 10, the mouthpiece 16 can be reconnected to the device 10.

The aerosol-forming cartridge 14 comprises an air inlet 18 and an air outlet 20, as described in more detail with reference to FIG. 2. The mouthpiece 16 comprises a mouthpiece air inlet 22 that aligns with the cartridge air inlet 18 when the mouthpiece 16 is attached to the device 10. Similarly, the mouthpiece 16 comprises a plurality of mouthpiece air outlets 24 that overlie the cartridge air outlet 20 when the mouthpiece 16 is attached to the device 10.

Figure 2:
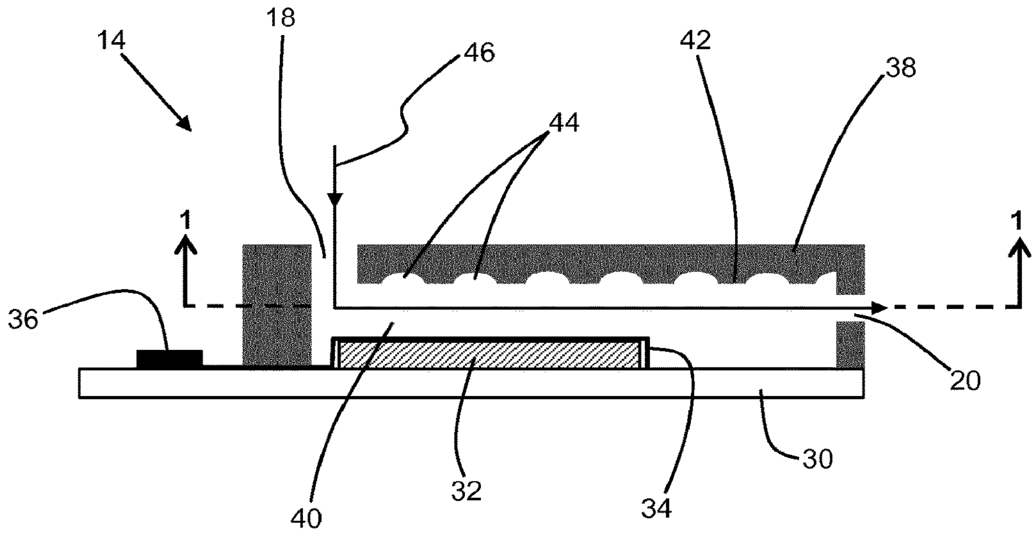
FIG. 2 shows a vertical cross-sectional view of the aerosol-forming cartridge shown in FIG. 1.

FIG. 2, which shows a vertical cross-sectional view through the aerosol-forming cartridge 14, shows the aerosol-forming cartridge 14 in more detail. The cartridge 14 comprises a base layer 30 on which an aerosol-forming substrate 32 is positioned. An electrically conductive heating mesh 34 overlies the aerosol-forming substrate 32 and terminates at electrical contacts 36 at an upstream end of the cartridge 14. During use, the electrical contacts 36 contact a similar set of electrical contacts within the aerosol-generating device 12 so that electrical energy can be supplied from the device 12 to the electrically conductive heating mesh 34 to heat the aerosol-forming substrate 32.

A top cover 38 overlies the aerosol-forming substrate 32 so that the top cover 38 and the base layer 30 substantially enclose the aerosol-forming substrate 32. The air inlet 18 and the air outlet 20 are provided in the top cover 38 so that an air flow channel 40 is defined between the top cover 38 and the base layer 30 and extends between the air inlet 18 and the air outlet 20. The aerosol-forming substrate 32 is positioned within the air flow channel 40.

An internal surface of the top cover 38 forms an internal wall surface 42 of the air flow channel 40 and comprises a plurality of flow disturbing devices 44 in the form of dimples. The dimples provide a turbulent boundary layer in the flow of air 46 through the air flow channel 40 and regulate the resistance to draw through the system 10.

Figure 3:
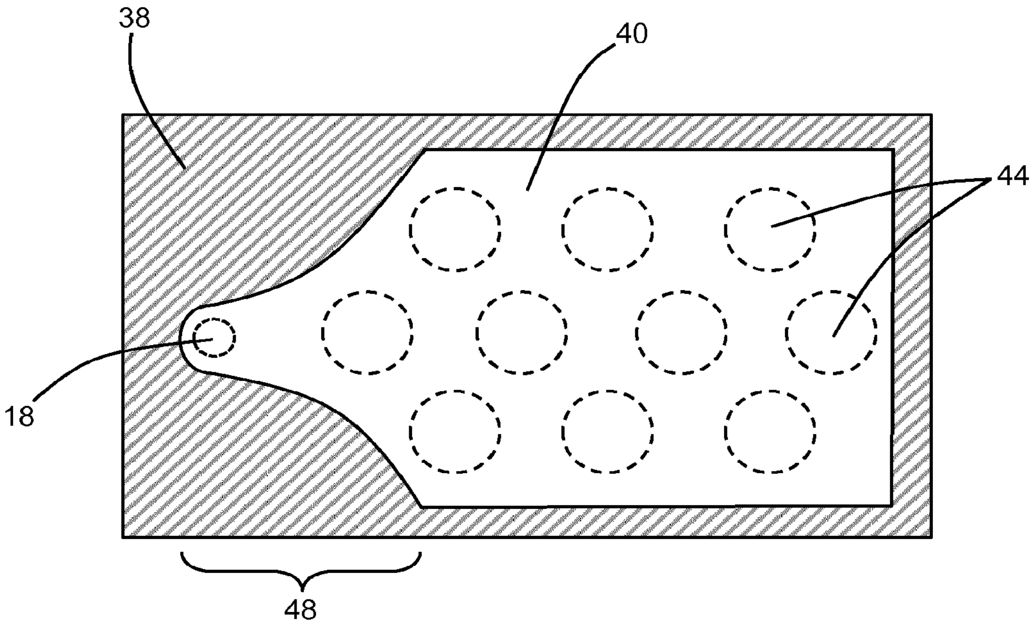
FIG. 3 shows a horizontal cross-sectional view of the aerosol-forming cartridge along the line 1-1 in FIG. 2.

FIG. 3 shows a horizontal cross-sectional view through the aerosol-forming cartridge 14, taken along line 1-1 in FIG. 2. FIG. 3 shows the horizontal cross-sectional profile of the air flow channel 40 formed by the top cover 38. The air flow channel 40 comprises a diffuser section 48 in which the air flow channel 40 becomes wider between the air inlet 18 and the air outlet 20. The diffuser section 48 results in a reduction of the air flow velocity from the air inlet 18 to the air outlet 20, the reduction of air flow velocity optimising the formation of aerosol droplets. For reference, the locations of the air inlet 18 and the flow disturbing devices 44 are indicated with the dashed lines.

The invention claimed is:

1. An electrically operated aerosol-generating system, comprising:

an aerosol-generating device;

an aerosol-forming cartridge comprising at least one aerosol-forming substrate, the aerosol-forming cartridge being at least partially received within the aerosol-generating device;

at least one electric heater configured to heat the at least one aerosol-forming substrate;

at least one air inlet and at least one air outlet; and an air flow channel extending between the at least one air inlet and the at least one air outlet, the air flow channel being in fluid communication with the aerosol-forming substrate, wherein the aerosol-generating device comprises an electric power supply to operate the at least one electric heater to heat the at least one aerosol-forming substrate;

wherein the air flow channel has an internal wall surface on which one or more flow disturbing devices are disposed, the flow disturbing devices being arranged to create a turbulent boundary layer in a flow of air drawn through the air flow channel, wherein the internal wall surface is opposite the at least one aerosol-forming substrate, wherein the aerosol-forming cartridge further comprises a base layer and the at least one aerosol-forming substrate is disposed on the base layer, wherein the aerosol-forming cartridge further comprises a top cover overlying the at least one aerosol-forming substrate and secured to the base layer, wherein the air flow channel is at least partially defined between the top cover and the base layer so that the at least one aerosol-forming substrate is in fluid communication with the air flow channel, wherein the internal wall surface on which the one or more flow disturbing devices are disposed is at least partially formed by the top cover, wherein the one or more flow disturbing devices comprise a plurality of dimples on the internal wall surface, wherein each dimple forms a depression in the internal wall surface, and wherein the plurality of dimples have a number average maximum diameter of from 3 millimetres to 6 millimetres.

2. The electrically operated aerosol-generating system according to claim 1, wherein the one or more flow disturbing devices comprise one or more dimples or undulations on the internal wall surface.

3. The electrically operated aerosol-generating system according to claim 2, wherein the one or more dimples or undulations have a number average maximum depth of from 0.3 millimetres to 0.8 millimetres.

4. The electrically operated aerosol-generating system according to claim 2, wherein the one or more dimples or undulations have a number average maximum depth of from 15 percent to 80 percent of the thickness of the air flow channel.

5. The electrically operated aerosol-generating system according to claim 1, wherein the air flow channel comprises a diffuser section in which a flow area of the air flow channel is increased in a downstream direction from the at least one air inlet to the at least one air outlet.

6. The electrically operated aerosol-generating system according to claim 5, wherein a maximum cross-sectional area of the at least one air inlet is between 1 percent and 40 percent of a maximum cross-sectional area of the diffuser section.

7. The electrically operated aerosol-generating system according to claim 1, wherein each of the base layer and the at least one aerosol-forming substrate has a thickness to width ratio of between 1:2 and 1:20, and wherein the base layer and the at least one aerosol-forming substrate are arranged substantially parallel to each other.

8. The electrically operated aerosol-generating system according to claim 1, wherein the aerosol-generating device comprises a wall overlying the at least one aerosol-forming substrate and the base layer when the aerosol-forming cartridge is inserted into the aerosol-generating device, and wherein the air flow channel is at least partially defined between the aerosol-generating device wall and the base layer so that the at least one aerosol-forming substrate is in fluid communication with the air flow channel.

9. The electrically operated aerosol-generating system according to claim 8, wherein the internal wall surface on which the one or more flow disturbing devices are disposed is at least partially formed by the aerosol-generating device wall.

10. The electrically operated aerosol-generating system according to claim 1, wherein the flow disturbing devices occupy from 30% to 100% of the internal wall surface area.

11. The electrically operated aerosol-generating system according to claim 1, wherein the at least one aerosol-forming substrate comprises nicotine.

12. The electrically operated aerosol-generating system according to claim 1, wherein the at least one electric heater is provided in the aerosol-generating device.

13. The electrically operated aerosol-generating system according to claim 1, wherein the at least one electric heater is a removable heater configured to be inserted into and removed from the aerosol-generating device.

14. The electrically operated aerosol-generating system according to claim 13, wherein the removable heater is separate from the aerosol-generating device and the aerosol-forming cartridge.

15. The electrically operated aerosol-generating system according to claim 1, wherein the at least one electric heater forms part of the aerosol-forming cartridge.

16. The electrically operated aerosol-generating system according to claim 1, wherein the at least one air inlet and the at least one air outlet are defined by the top cover.

17. The electrically operated aerosol-generating system according to claim 16, wherein the plurality of dimples extends from the air inlet to the air outlet.

18. The electrically operated aerosol-generating system according to claim 1, wherein the base layer and the at least one aerosol-forming substrate are substantially flat and are arranged substantially parallel to each other.

19. The electrically operated aerosol-generating system according to claim 1, wherein the base layer extends further in a downstream direction of the flow than the at least one aerosol-forming substrate.

* * * * *